Figure 1:
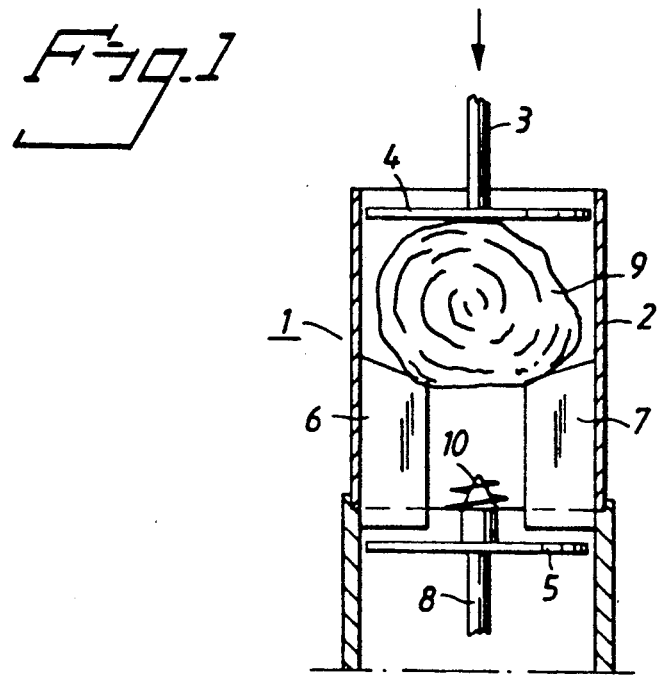

United States Patent [19]

Sundquist

[11] Patent Number: 5,129,591
[45] Date of Patent: Jul. 14, 1992

[54] VEGETABLE CUTTING MACHINE

[75] Inventor: Jarl Sundquist, Sollentuna, Sweden

[73] Assignee: AB Hällde Maskiner, Spanga, Sweden

[21] Appl. No.: 678,735

[22] Filed: Apr. 1, 1991

[30] Foreign Application Priority Data

Apr. 4, 1990 [SE] Sweden .................. 9001238

[51] Int. Cl.⁵ .............................................. B02C 1/08
[52] U.S. Cl. ................... 241/282.2; 241/294; 99/543; 99/545
[58] Field of Search ............... 241/277, 282.1, 282.2, 241/293, 294; 99/543, 545

[56] References Cited

U.S. PATENT DOCUMENTS

| | | | |
|---|---|---|---|
| 2,156,421 | 5/1939 | Austria | 241/282.1 |
| 2,903,198 | 9/1959 | Asplin | 241/199.12 X |
| 3,468,355 | 9/1969 | Hall | 99/537 |
| 3,696,847 | 10/1972 | Ereksen et al. | 99/545 |
| 4,186,096 | 1/1980 | Areaux et al. | 241/282.2 X |

Primary Examiner—Mark Rosenbaum
Assistant Examiner—Frances Chin
Attorney, Agent, or Firm—Nies, Kurz, Bergert & Tamburro

[57] ABSTRACT

A vegetable cutting machine comprising a vegetable feeder which includes a vertically upstanding cylindrical tube (2) and a vegetable press-feed device in the form of a plate (4) which extends perpendicularly to the longitudinal axis of the tube and is movable linearly in relation to the tube, wherein the plate can be swung away from the top orifice of the tube so as to allow vegetation to be inserted into the tube for disintegration in the machine, and wherein a cutting tool comprising a disc provided with one or more knives is mounted adjacent the bottom orifice of the tube. The invention is characterized in that the machine further includes a drill (10) which is nonrotatably mounted on a driven shaft (8) in the centre of said disc (5); in that the drill (10) is conically configured with the cone apex directed away from the disc; and in that the drill lands (11) have the form of relatively thin and radially projecting flanges.

5 Claims, 1 Drawing Sheet

VEGETABLE CUTTING MACHINE

The present invention relates to improvement in vegetable cutting machines, i.e. machines which are intended for cutting and disintegrating vegetables, including both green vegetables and root vegetables.

Machines of this kind are used in large kitchens and restaurants for disintegrating green and root vegetables, hereinafter referred to as vegetables.

One such known machine is described in U.S. Pat. No. 3,468,355 to E.O.S. Hall for Device in Machines for Cutting Foodstuff. This known machine comprises a vegetable feeder, or hopper which includes a vertically upstanding cylindrical tube and a vegetable press-feeding device in the form of a plate which extends perpendicularly to the longitudinal axis of the tube. The plate can be moved linearly in the tube, either manually or mechanically with the aid of drive means. The plate can also be swung away from the upper tube orifice, in order to allow vegetables to be inserted into the tube for disintegration in the machine. Located adjacent the bottom orifice of the tube is a cutting tool which includes a disc that is provided with one or more knives. When the disc rotates and the content of the vegetable feeder is pressed down against the cutting tool, the vegetables are disintegrated or cut and pass down through apertures provided in the cutting tool in the proximity of the knives.

Certain vegetables, and in particular the heads of white cabbage, have a relatively hard stalk. When using a vegetable cutter of the aforedescribed kind, the cabbage head is placed in the vegetable feeder so that the stalk will lie parallel with the longitudinal axis of the tube. It is known to provide a rotating knife in the centre of the aforesaid disc, partly to facilitate disintegration of the stalk and partly to reduce the force required to press the vegetable against the cutting disc. The disadvantage with a rotating knife, however, is that the knife disintegrates the stalk into small crumb-like pieces which cannot be sorted out from the remainder of the disintegrated cabbage head, and consequently the final product will contain these stalk crumbs, which is something to be avoided if food quality is to be improved.

The rotating knife has the form of two knife blades which project radially outwards from a vertical shaft. The blades may be positioned horizontally or at an angle to the horizontal plane. Consequently, when the knife rotates, it forms a stop against which the stalk is pressed while, of course, disintegrating the stalk at the same time. As a result of this stop, considerable force is needed to press the vegetable, in this case a white cabbage, against the cutting knife, even though this force is, of course, much smaller than the force required when no rotating knife is used. The magnitude of the vegetable feeding force required is particularly significant in vegetable cutting machine in which the vegetable press-feed device is operated manually.

The present invention solves the problem of disintegrating vegetable stalks into small crumb-like particles, while considerably lowering the force required to feed the vegetables down onto the cutting knife.

The present invention thus relates to an improvement in vegetable cutting machine of the kind comprising a vegetable feeder, or hopper, which includes a vertically upstanding cylindrical tube and a vegetable press-feed device in the form of a plate which extends perpendicularly to the longitudinal axis of the tube and is displaceable linearly in relation to said tube, and which plate can be swung away from the upper orifice of the tube so as to enable vegetables to be placed in the tube for disintegration in said machine, and wherein a cutting tool comprising a disc provided with one or more knives is mounted adjacent the bottom orifice of said tool, the invention being characterized in that the improvement comprises a drill which is mounted non-rotatably on a driven shaft in the centre of said disc; in that the drill is conically shaped with the cone apex directed away from the disc; and in that the drill lands have the form of relatively thin and radially extending flanges.

Figure 2:
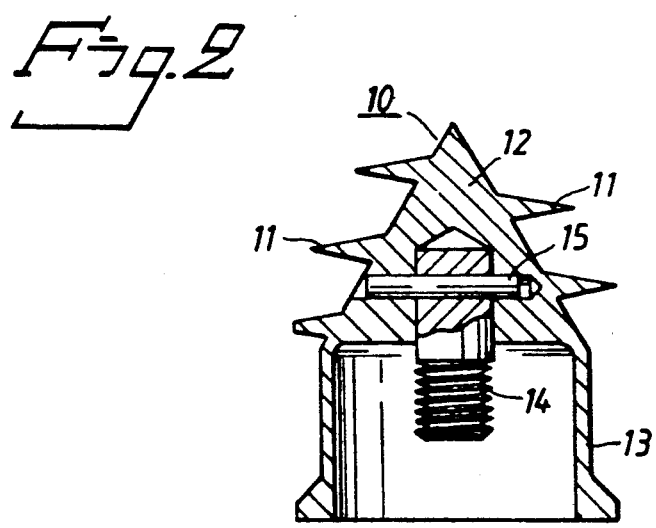

The invention will now be described in more detail with reference to an exemplifying embodiment thereof illustrated in the accompanying drawing, in which FIG. 1 illustrates schematically a vegetable cutting machine in which the invention is applied; and FIG. 2 illustrates the inventive improvement in larger scale.

FIG. 1 illustrates schematically part of a vegetable cutting machine. The machine includes a vegetable feeder 1 comprising a vertically upstanding cylindrical tube 2 and a vegetable press-feed device 3 in the form of a plate 4 which extends perpendicular to the long axis of the tube and which can be moved linearly in relation thereto. The plate 4 is pressed down in the arrowed direction, either by means of a pneumatic piston-cylinder device (not shown) or manually. The plate 4 is shown in an upper position where it is located above the top orifice of the cylinder and, as taught on the above-mentioned Patent to Hall can be swung to one side in order to allow vegetables to be inserted into the tube for disintegration in the machine.

Mounted adjacent the bottom orifice of the tube 2 is a cutting tool 5 which includes a disc provided with one or more knives. A large number of different cutting tools are available, the design of these tools determining the manner in which the vegetable is disintegrated. The cutting tool 5 is carried by a shaft 8 driven by an electric motor, not shown. When a vegetable, such as the head 9 of a white cabbage, is fed down against the cutting tool 5 by means of the feeder 1, the cutting tool will cut or shred the head and the shredded pieces of cabbage will pass through apertures provided in the cutting tool, in a known manner.

The vegetable feeder is equipped with radially and inwardly extending blades 6, 7 which prevent the vegetable form rotating when coming into contact with the cutting tool 5.

The aforedescribed relates to one embodiment of known vegetable cutting machines.

In accordance with the invention, the described machine is provided with a drill 10 which is fixedly mounted on the rotatably driven shaft 8, for co-rotation therewith, in the centre of the disc 5. The drill 10 has a conical configuration with the cone apex directed away from the disc 5. The lands of the drill have the form of relatively thin and radially projecting flanges 11, see the axial section view of the drill shown in FIG. 2.

According to one preferred embodiment, the flanges or lands 11 project from a central conical part 12 of the drill 10. The base of the conical part merges with a tubular part 13 which is intended to coact with the shaft 8 in a manner to enable the drill to be fitted non-rotatably to the shaft 8. To this end, the tubular part 13 may have provided in the centre thereof a peg 14 for coaction with the shaft 8 such as to obtain non-rotatable connection between the shaft and the drill. The peg 14 is attached to the conical part of the drill by means of a locking pin 15.

According to another preferred embodiment, the height or vertical extension of the conical part 12 of said drill corresponds to the diameter of the base of said conical part.

According to a further preferred embodiment, the lands extend from the drill apex to the drill base 2 in five turns, preferably approximately two turns.

The function of the drill 10 is to eat, for instance, into the head 9 of a white cabbage fed down towards the cutting tool. The drill thus draws the cabbage head down onto the cutting tool while splitting apart the stalk of the cabbage head at the same time. Consequently, the stalk will not be disintegrated into crumb-like pieces but will, instead, be disintegrated in a fashion similar to the remainder of the cabbage head. Because the drill eats into the cabbage head, the requisite feeding force, i.e. the force required to press the plate downwards, will be much smaller than the force required with the aforedescribed known machine using rotating knives.

The present invention thus overcomes the aforedescribed drawbacks of the known technique.

It will be understood that the width and pitch of the drill lands 11 can be varied and adapted to the vegetables to be disintegrated in the machine.

The present invention is therefore not restricted to the illustrated embodiment, since modifications can be made within the scope of the following claims.

I claim:

1. A vegetable cutting machine comprising a vegetable feeder which includes a vertically upstanding cylindrical tube (2) with top and bottom openings and a vegetable press-feed device in the form of a plate (4) which extends perpendicularly to the longitudinal axis of the tube and is movable linearly in relation to said tube, wherein the plate can be swung away from the top opening of the tube so as to allow vegetables to be inserted into the tube for disintegration in the machine, and wherein a cutting tool comprises a rotatable disc provided with at least one knife mounted adjacent the bottom opening of the tube, and wherein said machine further includes a drill (10) which is non-rotatably mounted on a rotatably driven shaft (8) in the centre of said disc (5); said drill (10) being conically configured with the conical apex directed away from the disc and upward toward the top opening of the tube; and the drill has lands (11) which are formed from at least one relatively thin and radially projecting flange which spirals toward the conical apex and in the direction of rotation of said shaft.

2. A machine according to claim 1, wherein said drill has a central conical part with a circular base and a tubular sleevelike part depending from said base and said lands (11) project outwardly from said central conical part (12); said base of the conical drill part merges with said tubular sleevelike part (13); and connector means (14, 15) are fixed to said base and are adapted to connect with said shaft (8) to enable the drill to be non-rotatably connected to the shaft.

3. A machine according to claim 1, wherein said central conical part (12) includes a circular base and has a vertical dimension which is essentially equal to the diameter of said base.

4. A machine according to claim 1, wherein the flange which provides said lands (11) extends from said apex of the drill to the base thereof in at least two turns.

5. A machine as defined in claim 4 wherein said lands extend from said apex of the drill to the base thereof in five turns.

* * * * *